Figure 1:
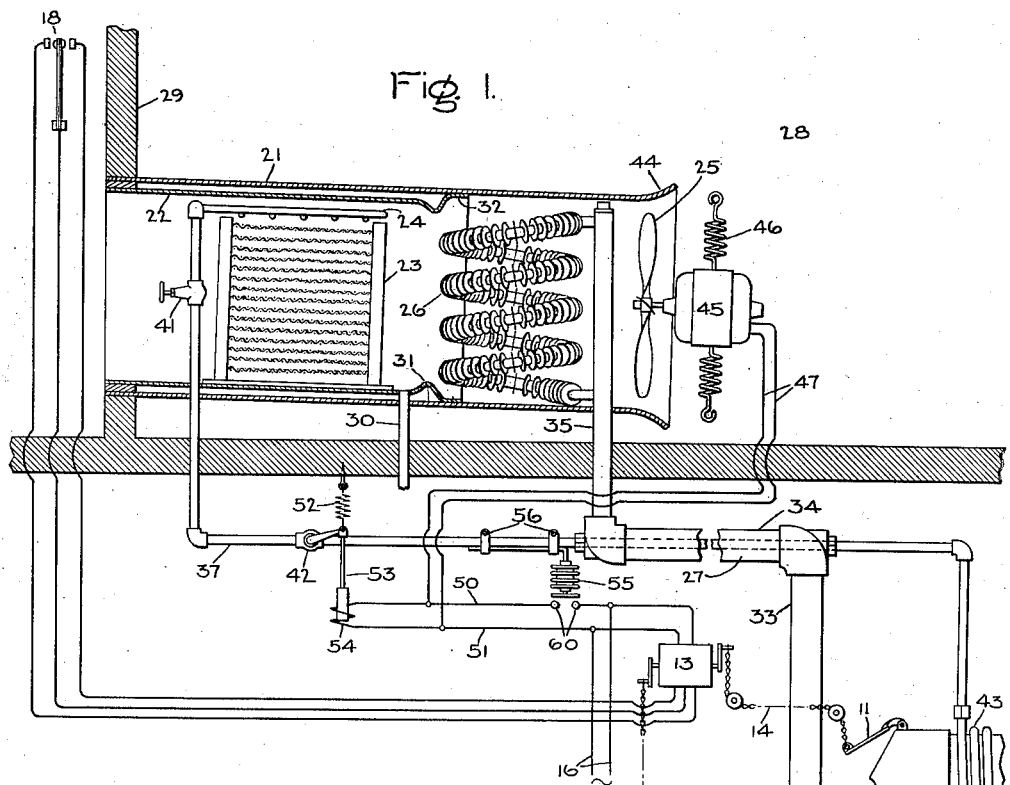

Sept. 7, 1937.         C. C. BAILEY          2,092,630
HUMIDIFYING APPARATUS FOR AIR CONDITIONING
Filed June 29, 1934          2 Sheets-Sheet 1

Inventor:
Clarence C. Bailey,
by Harry E. Dunham
His Attorney.

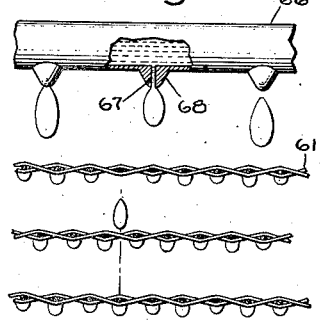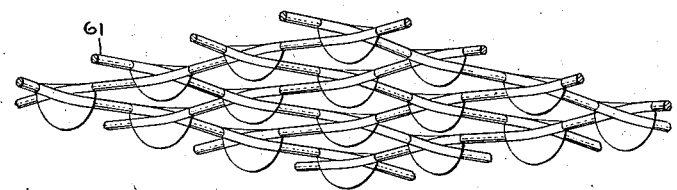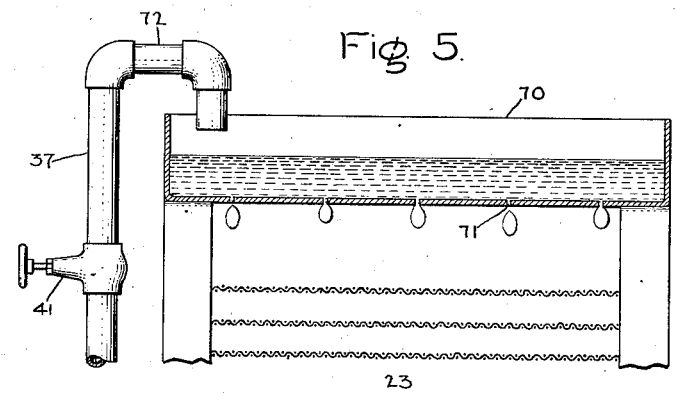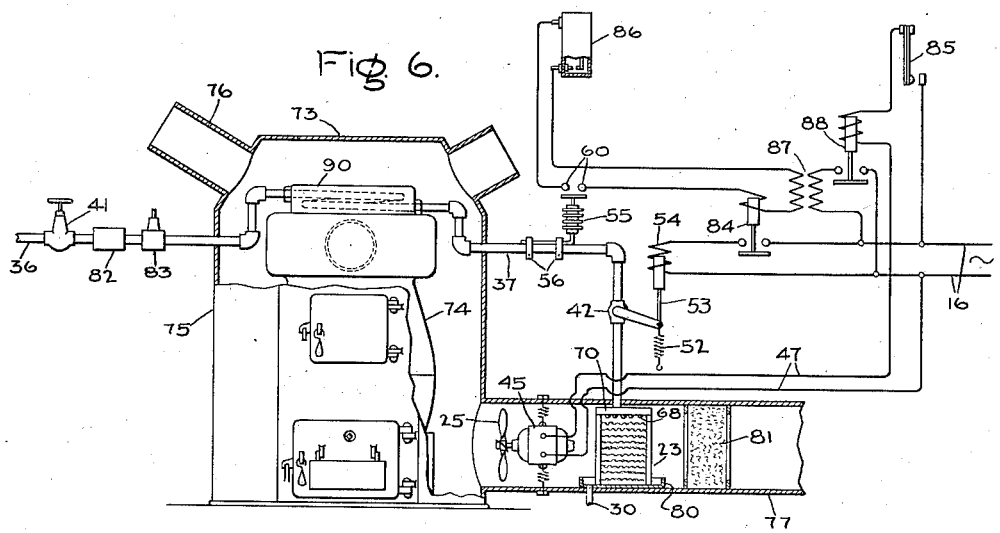

Patented Sept. 7, 1937

2,092,630

UNITED STATES PATENT OFFICE 2,092,630

HUMIDIFYING APPARATUS FOR AIR CONDITIONING

Clarence C. Bailey, Schenectady, N. Y., assignor to General Electric Company, a corporation of New York Application June 29, 1934, Serial No. 733,077

8 Claims. (Cl. 261—15)

My invention relates to air conditioning and particularly to improvements in humidifying apparatus.

A principal object of my invention is the provision in a humidifying apparatus of means for suspending a multiplicity of globules of water substantially uniformly throughout the humidifying zone of the apparatus whereby maximum evaporation of the water may take place for a given space.

More specifically, an object of my invention is the provision of an improved evaporating unit in the form of a stack of wire mesh screens capable of accumulating and suspending globules of water at the intersections of the wires of the screens.

Another object of my invention is the provision of improved means for feeding a plurality of substantially uniformly distributed streams of water downwardly into a humidifying zone and for substantially preventing the impairment of the operation of the water supply means by the accumulation of undesirable scale and other precipitation.

Still another object of my invention is the provision in a humidifying apparatus for a building having a central heating plant, of means associated with the heating plant for preheating the humidifying water. Preferably means should also be provided in association with such central heating plant for preheating the air to be humidified.

A further object of my invention is the provision of an improved method and apparatus for controlling the supply of water to a humidifying zone in a manner to avoid excess humidification of the air treated therein, and to limit the precipitation of solid matter from the water to amounts which are not excessive and which are capable of easy removal.

A still further object of my invention is the control of the supply of preheated water to a humidifier in response to a predetermined temperature of the water.

In the past, the methods most commonly employed for humidifying air have been: (1) Forcing a stream of air through one or a plurality of strips of fabric or perforated baffles, or screens, placed transversely of the direction of air flow and wetted by various means, (2) passing air over one or a plurality of water films or surfaces produced by wetted strips of fabric or perforated screens or pans of water placed substantially parallel to the direction of air flow, and (3) circulating air through particles of water sprayed into a humidifying zone.

It has been found that certain disadvantages are attendant upon the use of each of the above methods. If fabric is employed in the first method, the air flow is greatly retarded thereby and the energy required to force a given quantity of air through the humidifying zone is very high. If perforated baffles or screens are used, the retardation is less but there is a pronounced tendency for particles of water to become entrained in the air stream as distinguished from the desired evaporation of the water.

When air is passed over water films or surfaces as in the second method the disadvantage of retardation of the air flow may not be present but the layers of air flowing in planes parallel to and immediately adjacent the comparatively flat surfaces of the water receive excessive moisture while the layers of air flowing in planes parallel to but removed from said surfaces will receive relatively less and less moisture depending upon their distances from the surfaces. This produces nonuniform humidification and necessitates large evaporating surfaces and large quantities of water to produce the desired degree of humidification. Furthermore, in cases in which the humidifying water is preheated, if screens are employed which produce a film of water, the heat retentive capacity of the film is small and the temperature differential between the water and the air, which is conducive to ready evaporation of the water, cannot be maintained as in the case of larger bodies of water.

The chief disadvantages of the third method are the pronounced tendency for the air to entrain the drops of water sprayed into the humidifying zone and the excessive energy output required to spray sufficient quantities of water into the zone to produce the required degree of humidification. Due either to the force of gravity or the force with which the drops are sprayed into the zone, the time of their passage through the zone and of their exposure to the air stream is comparatively short resulting in the evaporation of only a small percentage of each particle of water and in large wastage.

In accordance with my invention and with the object in view of avoiding the disadvantages attendant upon the humidifying methods above outlined, I have provided an improved water evaporating unit whereby the water to be evaporated is accumulated in the form of a multiplicity of globules suspended at substantially uniformly distributed points throughout the humidifying zone. Such distribution of globules throughout the humidifying zone produces a slight degree of turbulence in the air flow therethrough and results in a more uniform humidification of the various layers of the air stream without producing appreciable retardation of the air flow through the zone. Furthermore, the drops or globules of water instead of passing quickly through the humidifying zone will be delayed and suspended for periods of time to permit their contact with large volumes of air resulting in an appreciably greater percentage of evaporation of the water supplied to the humidifying zone. If the water supplied to the humidifying zone is preheated to a temperature which is higher than that of the air passed through the zone, the heat retentive capacity of the globules, which is large in comparison to that of a film of water, will tend to preserve the temperature differential between the water and the air and thus increase the rate of evaporation. It has been found that by the distribution of globules of water uniformly throughout the humidifying zone as in my improved apparatus the percentage of evaporation of the water supplied to the zone is much higher than that which is obtainable by employing the apparatus and methods heretofore commonly used in humidification. Hence by applying my improved apparatus and method it is possible to obtain the desired evaporative capacity and degree of humidification in an appreciably smaller humidifying zone and with the requirement of appreciably less humidifying water supplied thereto, and furthermore the desired results may be obtained with a minimum of retardation of the air flow through the humidifying zone and without appreciable entraining of particles of water in the air stream.

For purposes of illustration, a preferred embodiment of my invention will be described hereinafter but it is obvious that various modifications may be made therein without departing from the spirit and scope of my invention. For disclosures of further applications of and improvements in my invention, reference may be had to the copending applications of R. U. Berry, Serial No. 733,041 filed June 29, 1934, now Patent 2,008,540, issued July 16, 1935, Sydney E. Miller, Serial No. 736,684, filed July 24, 1934, now Patent 2,006,928 issued July 2, 1935, and M. Stanton, Serial No. 734,975, filed July 13, 1934, now Patent 2,035,728, issued March 21, 1936, all of which applications are assigned to the assignee of the present invention.

Figure 2:
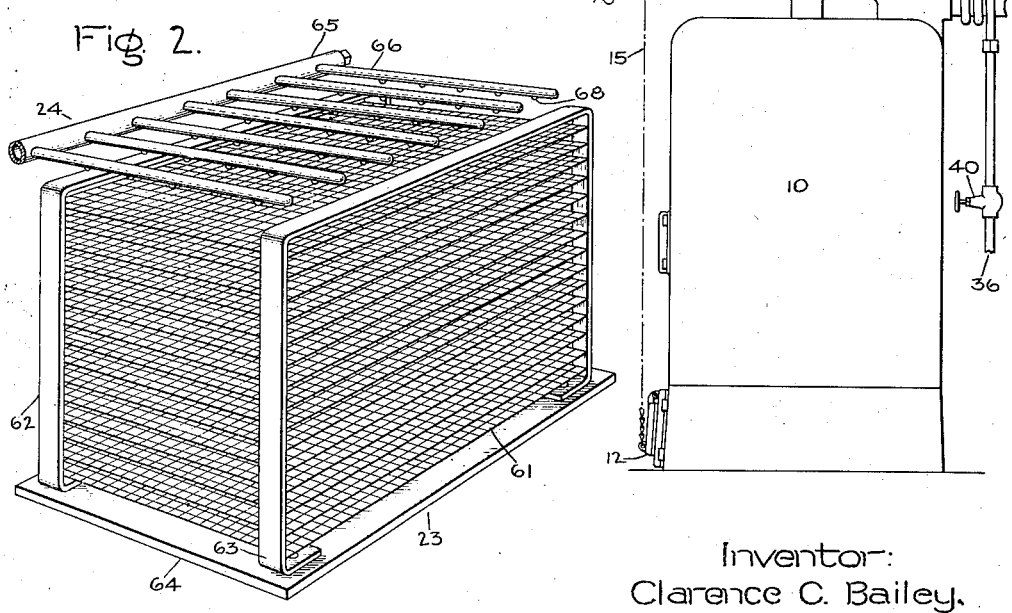

The manner in which I carry out my invention may be readily understood from the following description taken in conjunction with the accompanying drawings in which Fig. 1 diagrammatically illustrates the cooperative relationship of the various elements of my improved humidifying apparatus; Fig. 2 is a perspective of a preferred embodiment of my improved screen stack water evaporating unit and the water distributing header associated therewith; Figs. 3 and 4 are detailed showings of portions of the evaporating unit for aid in a better understanding of the construction and operation thereof; Fig. 5 diagrammatically illustrates a modified form of water distributing header, and Fig. 6 diagrammatically illustrates a modified application and association of the various elements of my improved humidifying apparatus.

Referring particularly to Fig. 1, the furnace or central heating plant of the building in which my improved humidifying apparatus is to be installed is shown conventionally at 10 and may be any form of hot water or steam furnace which may have control dampers 11 and 12 operated by means of any well known form of furnace control device 13 through connecting chains 14 and 15. The control device 13 is energized from electrical supply lines 16 in response to operation of the thermostatic regulator conventionally shown at 18 and which may be located at any desired point in a room of the building. It is to be understood that the details of the furnace and of the control therefor form no part of my invention and that my improved humidifying apparatus may be installed to operate in conjunction with any of the various forms of central heating plants well known in the art.

Broadly, the humidifying apparatus may be said to consist of an enclosing casing 21 having therein an air duct 22, a water evaporating unit 23, a water supply and distributing header 24 for feeding water to the water evaporating unit, a fan 25 for blowing a stream of air through the evaporating unit and a heat radiator 26 disposed between the fan and the water evaporating unit for preheating the air to be humidified; and a tempering device 27 for preheating the water supplied to the water header 24.

Casing 21 may be of various forms and the duct 22, evaporating unit 23, header 24, fan 25 and radiator 26 may have various arrangements therein, and furthermore it is contemplated that the apparatus will be located wherever convenient but preferably in an out of the way place and as close as conveniently possible to the central heating plant so that it will require a minimum of connecting means for installation.

In the preferred embodiment illustrated in Fig. 1, the casing 21 is made in the form of a cylindrical duct having air duct 22 concentrically located therein. The casing may be located as shown in a closet or compartment 28 adjacent one of the rooms of the building with its discharge end in registry with an opening in the wall 29 of the room. In order that unevaporated water will not leak into the room, the two ducts are mounted with a slight slant downwardly from the wall opening and a drain 30 is provided to the rear of the unit 23 for carrying away the waste water which drains downwardly from the unit 23. The inner duct 22 is made shorter than the outer duct 21 and adjacent its inlet end and to the rear of the drain 30, it is provided with a contraction 31 for preventing leakage of waste water into the compartment 19. This contracted portion 31 also cooperates with the flared inlet end 32 of the duct to produce a smooth flow of the air from the fan into the duct and thereby lessen the noise of operation of the apparatus.

Heat radiator 26, which may be of any well known type but is herein shown for purposes of illustration as being of the fin tube type, is disposed within the duct 21 adjacent the inlet of the duct 22 and is supplied with heating medium from the furnace 10 by means of pipes 33, 34, and 35. Water is supplied to the distributing header 24 from any suitable source such as the water mains 36 by means of supply pipe 37. A portion of the pipe 37 is passed through the pipe 34 in heat exchange relation to the heating medium supplied by the furnace and thereby forms a tempering device for preheating the humidifying water supplied to the evaporating unit. It is preferable that the humidifying water be heated in the tempering device to a temperature just below the boiling point. Manually operable valve 40 is provided for isolating the water supply pipe from the water main when desired and manually operable valve 41 and solenoid operated valve 42 are provided for controlling the supply of humidifying water to the evaporating unit. Economy in the preheating of the humidifying water may be effected by means of an economizer coil 43 inserted in the supply pipe 37 and placed in heat exchange relationship with the exhaust of the furnace 10.

It is preferable that fan 25 be disposed just inside the casing 21 adjacent the inlet opening thereof which preferably is flared, as shown at 44, in a manner to produce smooth and substantially noiseless flow of air into the casing, and the fan is driven by means of electric motor 45 resiliently mounted, as conventionally shown at 46, either within the casing 21 or from convenient supporting means within compartment 28 as illustrated. Motor 45 is connected to be energized from the electrical supply line 16, through lines 47 and lines 50—51.

Valve 42, normally biased to closed position by suitable means such as springs 52, is arranged to be operated by means of a solenoid plunger 53 having an energizing winding 54 connected to be energized from lines 50—51 in parallel with the fan motor.

A heat sensitive control device such as an expansible fluid bellows-type thermostatic relay 55 is suitably fastened as by means of clips 56 in heat conductive relation to supply pipe 37 adjacent the point at which the pipe leaves the tempering device 27. This relay is arranged to complete the electrical circuit through contacts 60 in the line 50 upon sufficient expansion of the fluid in the bellows, and is adjusted to operate in response to a predetermined temperature of the humidifying water leaving the tempering device to energize coil 54 of the solenoid and fan motor 45 from supply line 16.

The water evaporating unit 23, details of which are shown in Figs. 2, 3, and 4, comprises a plurality of substantially horizontally disposed wire mesh screens 61 stacked in superposed spaced apart relation to each other and held in position by means of supporting frames 62 and 63, to which the screens are secured by soldering or other suitable means and which frames are mounted upon the supporting base 64. It is obvious that the screens need not be placed in an exact horizontal plane but may be positioned at an angle, as shown in Fig. 1. The angle at which the screen may be placed is limited, however, because of the fact that when the limiting angle is exceeded the water tends to run down the meshes of a screen rather than to form drops which go through the layers of screens progressively. From the construction of the evaporating unit it is obvious that it may readily be removed from the casing 21 for cleaning or replacement. In my improved evaporating unit, the mesh dimension of the screens employed is such that the distance between the wires prevents water deposited on the surfaces of the screens from filming thereover and each of the intersections of the wires forms a conglobating point at which water tends to collect in suspended globules as illustrated in Figs. 3 and 4. In practice it has been found that depending globules will be formed by a screen having a mesh size in the neighborhood of .25″ but that the desired results may be obtained with screens of larger mesh, and in some instances, depending upon the size of the wire employed and the form of the wire intersections with screens having a mesh size as small as .20 inch. However, the .25″ mesh screen is usually to be preferred since this size is sufficient to prevent filming and yet will produce the maximum number of globules for a given screen area, which is desirable for reasons hereinafter to be given.

In the preferred embodiment of my invention the respective screens of the evaporating unit are stacked with sufficient space between them to afford room for the globules and to permit free circulation of air through the unit, and also in vertically staggered relation with respect to each other, as shown in Fig. 3, so that the spaces between the wires of the individual screens will not be in vertical alignment with the corresponding spaces of the screens immediately above and below. The staggered arrangement aids the globule formation by assuring that a drop of water falling through a space in one screen will strike an intersection of a screen disposed therebelow with the result that the drop is delayed in its passage through the unit and is broken up into smaller particles which are more readily vaporizable and which do not have such momentum that they tend to pass through the unit without collecting in globules at the intersections of the screens.

Although I have illustrated as the preferred embodiment of my improved evaporating unit, a plurality of screens, having the proper mesh size, stacked in vertically staggered relation to each other, which arrangement it has been found will give the maximum evaporation for a given space, it is obvious that a degree of evaporative capacity sufficient for some installations may be obtained by the use of a single screen capable of forming suspended globules of water or by the use of a plurality of such screens stacked in symmetrical or non-staggered relation to each other, and such modifications are within the spirit and scope of my invention.

The water distributing header 24 as illustrated in Figs. 2 and 3, comprises a main header 65 supplied with water from pipes 37 and having a plurality of branch headers 66 extending outwardly therefrom at right angles. The branch headers are arranged to be disposed above the evaporating unit and are provided with a plurality of openings 67 for discharging streams of water downwardly onto the screen stacks in a manner to produce uniform distribution of the water over the top screen of the stack. In their preferred embodiment, the branch headers are provided with burrs or protuberances 68 surrounding the discharge openings. I have found that by this means, the stopping up of the openings due to deposits of scale is largely prevented, since the water discharged from the openings will not tend to collect on the underneath side of the headers, as would be the case in the absence of the burrs, but will fall directly from the tips of the burrs which provide substantially no surface for the collection and evaporation of water in quantities sufficient to produce harmful precipitation of salt residue.

A modified form of water distributing header is illustrated in Fig. 5 and comprises a pan 70 having relatively small discharge openings 71 in the bottom thereof.

If the openings are made small enough to restrict the flow therethrough, water will tend to accumulate in the pan until it rises to a height which will produce sufficient gravitational head in the openings to overcome the resistance of the openings to the flow of the water therethrough. This will tend to produce an equal flow through all the openings with the result that the water is evenly distributed over the top layer of the screen stack. This would not be the case if the openings were made large enough to permit free flow therethrough since the water would tend to flow rapidly through the openings nearest the supply pipe and would not distribute uniformly over the bottom surface of the pan. The pan 70 is mounted in any suitable manner in the casing 21 above the evaporating unit and L-shaped discharge pipe 72 is connected to supply pipe 37, in the place of the header pipe 65 previously referred to, to feed water to the pan 70. The head of the water in the pan, and hence within certain limits the amount discharged therefrom, may be controlled by adjustment of the supply pipe valve 41. It is preferred that the openings 71 be provided with burrs or protuberances similar to those provided on the headers 66 for the reasons previously outlined.

In the operation of the embodiment of the apparatus illustrated in Fig. 1, closing of the contacts of the house thermostat 18 "calling for heat" will cause furnace control device 13 to adjust properly dampers 11 and 12 resulting in heating up of the furnace. Heating medium will be supplied by the furnace to the house heating system (not shown) and also to the radiator 26 through pipes 33, 34 and 35. Humidification is prevented from taking place until the water in the supply pipe 37 as it leaves tempering device 27 reaches the proper temperature which is preferably just below the boiling point, whereupon expansion of the fluid in the bellows at thermostatic relay 55 closes the circuit through contacts 60 for energizing fan motor 25 and solenoid 53, which latter opens valve 42 and permits water being supplied to the distributing header 65—66, or 70, as the case may be. Operation of the fan 25 will produce a stream of air through the radiator 26 over the surfaces of the globules held in suspension by evaporating unit 23 and out through the discharge opening of the casing 21 into the room. Heating the air increases its capacity for absorbing moisture, but it is preferable that it should not be raised to as high a temperature as that of the globules of the water since the maintenance of a temperature differential between the water and air further aids evaporation. Since the supply of water to the evaporating unit is completely turned off except when the water is at a predetermined proper temperature and the fan is operating, there is no chance for the collecting of excess water in the unit during shut-down of the apparatus which might result in the blowing of undesirable cold and excessively humidified air into the room when operation of the apparatus is again initiated.

By adjustment of valve 41, the supply of water to replenish the globules as they evaporate can be regulated as desired but it is preferable that the water be supplied in quantity slightly in excess of the evaporative capacity of the apparatus, since if all the water supplied is evaporated, any foreign matter dissolved in the water will be precipitated on the screens and may eventually impair the functioning thereof, whereas if sufficient water is supplied to insure some wastage, the waste water will be carried away through drain 30 with the impurities held in concentrated solution therein. Some slight deposit of scale at the intersections of the wires of the screens is not objectionable but in fact may increase the efficiency of the unit by providing additional area of surface to which the drops may adhere, but the amount of such scale should not be so great that the spaces between the wires would become filled to an extent where the waste water would film over the screen. The evaporating unit may be readily removed from the casing 21 for cleaning or replacement. Furthermore, the provision of the burrs 68 on the distributing header will prevent or at least greatly retard stoppage of the discharge openings therein by scale deposits.

It will be seen from the above description that I have provided a simple but highly efficient humidifying apparatus and control therefor requiring a minimum of auxiliary apparatus and effort to install, and also requiring during operation very little care or attention except at infrequent intervals.

In Fig. 6 I have illustrated a modification of my improved humidifying apparatus arranged to operate in conjunction with a central heating plant 73 of the hot air type, and elements which are the same as those shown in the previously described figures are designated by the same numerals. Such a heating plant is illustrated as comprising a furnace 74 having an enclosing casing 75, a pipe 76 for supplying heated air to the heating system of the house, and an air inlet duct or casing 77 for supplying fresh air to the furnace casing 75. It is to be understood that the details of the central heating plant and of the control therefor which are not specifically applicable to the forms of my improved humidifying apparatus hereinafter described, form no part of my invention and may be of any of the types well known in the art.

Within the casing 77 are disposed electric motor driven fan 25 for drawing air into the casing and forcing it over the furnace 74, my improved evaporating unit 23, water distributing header 70 having burred openings 68, pan 80 for collecting unevaporated water and which is provided with drain 30, and an air filtering device 81 which may be of any well known type such as a removable frame having steel wool filler.

The water distributing header is illustrated as being of the pan type similar to the modification illustrated in Fig. 5 with the added feature that it is provided with the burred openings 68 similar to those provided on the pipe header illustrated in Fig. 3. Water is supplied to the pan 70 from the main 36 by means of supply pipe 37 which is provided with shut-off valve 41, boiler check valve 82, safety valve 83 and control valve 42. Control valve 42, normally biased to closed position by means of spring 52, is arranged to be operated by solenoid 53 having energizing winding 54 which is connected through the contacts of relay 84 to the electrical supply line 16, and the energizing winding of relay 84 is connected in series with the contacts of thermostatic relay 55 and house humidistat 86 across supply line 16 through transformer 87 and electrical interlocking relay 88. Fan motor 45 is connected through lines 47 and in series with thermostat 85 to the electrical supply line 16. The water for humidification is heated by means of the tempering device 90 which comprises a coil of pipe inserted in the supply pipe 37 and positioned in intimate heat conducting relation with the top of the furnace, and the expansible fluid filled bellows of relay 55 is connected in intimate heat conductive relation with the supply line 37 at a point adjacent that at which the supply line leaves the tempering devices 90.

The operation of the embodiment illustrated in Fig. 6 is as follows: Closing of the contacts of the house thermostat 85 in response to a "call for heat" by the thermostat energizes fan motor 45 and causes fan 25 to draw fresh air in through the casing 77, air filtering device 81, and evaporating unit 23 from whence it is forced over the surface of the furnace 74 where it is heated, and thence through the pipes 76 to the remainder of the house heating system. If at the same time the humidity in the building is below the predetermined value the contacts of the humidistat 86 will close and "call for humidity", and if the temperature of the humidifying water leaving the tempering device 90 is sufficient to produce operation of the thermostat 55 to close the contacts 60, relay 84 will be operated to close its contacts and energize the winding 54 of the solenoid 53 to open the control valve 42 and permit water to be fed to the water distributing header 70. As previously outlined, water from the pan 70 will be discharged through the burred opening 68 down onto the screen stack evaporating unit 23 where a portion will be evaporated by the air stream passing through the casing 77 and the remainder will collect in the pan 80 and be carried away by means of the drain 30. The formation of globules as previously described will take place at the intersections of the screens in the evaporating unit 23, and the amount of water supplied to the evaporating unit may be controlled by means of valve 41 to give the proper degree of humidification and to prevent the formation of excessive scale upon the screens as previously outlined. In this embodiment as in the embodiment illustrated in Fig. 1 the thermostatic relay 55 operates as a safety device to prevent the supply of water to the evaporating unit when the temperature of the water is below that which is desirable for proper humidification. A further safety device is provided in the form of the interlock 88 which has its energizing winding connected in series with the fan motor and is connected to prevent the energization of the winding of relay 84 when the fan is not in operation even though the humidistat 86 is "calling for humidity". This latter safety expedient prevents the collection of water on the evaporating unit when the fan is not operating to force a stream of air therethrough to evaporate the water.

It is obvious that various applications and modifications can be made of my improved humidifying apparatus and it is intended that these shall be within the scope of the appended claims in which I have pointed out that which I believe to be new and novel.

What I claim as new and desire to secure by Letters Patent of the United States is:

1. In an air conditioning apparatus the combination of a water evaporating unit including means for suspending a multiplicity of globules of water at substantially uniformly spaced predetermined points throughout a given humidifying zone, said means including a unitary stack-like structure consisting of a plurality of superposed wire meshed screens supported in substantially horizontal planes and in spaced apart relation to each other, said screens having a mesh of about .25 inch, means for feeding water to said unit, a source of heating medium, means for preheating the water fed to said unit including a heat exchange device associated with said source of heating medium, means for forcing a stream of air through and around the water globules formed by said unit, and heat radiating means connected to be supplied with heating medium from said source and disposed in the path of said stream of air for preheating the same.

2. In an air conditioning apparatus, the combination of a water evaporating unit, which unit includes means for forming a multiplicity of suspended globules of water disposed at substantially regular intervals horizontally and vertically throughout a given space, said means including a plurality of layers of intersection defining elements, the intersection defining elements being spaced substantially .25 inch apart and the layers being arranged substantially horizontally in superposed spaced apart relation, means for feeding water to said unit and means for producing a flow of air through said unit and over the surfaces of said drops.

3. In an air conditioning apparatus, the combination of means for evaporating water including a stack of superposed spaced apart horizontally disposed mesh screens, means for supplying water to said stack including means disposed thereabove for distributing water over the uppermost screen of said stack, means for preheating the water supplied to said stack, means for causing a stream of air to pass through said stack of screens, means for heating said stream of air, and means responsive to the temperature of the water supplied to said stack for controlling said supply of water.

4. In an air conditioning apparatus, a water evaporating unit, selectively operable means for supplying water to said unit, selectively operable fan means for forcing a stream of air through said unit, heat radiating means disposed between said fan means and said unit in the path of said air stream, selectively operable heat generating means connected to supply heating medium to said heat radiating means, means associated with said heat generating means for preheating the water supplied to said evaporating unit, thermostatic means electrically connected for initiating the operation of said heat generating means, said water supplying means and said fan means, and means responsive to the temperature of the water supplied to said evaporating unit for preventing operation of said water supplying means and said fan means until said temperature reaches a predetermined value.

5. In an air conditioning apparatus, the combination of an enclosing casing having air inlet and outlet openings and a humidifying zone, fan means for circulating air through said zone, water supply means including a distributing element disposed at the top of said zone for feeding a plurality of streams of water down through said zone, means disposed in said zone beneath said streams of water for converting the same into easily vaporizable particles and for accumulating and suspending a multiplicity of globules of water at predetermined points in the path of said circulated air, said means including a stack of wire mesh screens supported in substantially horizontal planes and in spaced apart relation to each other, said screens having a mesh of at least .20 inch, and means disposed in the bottom of said zone for collecting and conveying away unvaporized water.

6. A liquid evaporating unit adapted to be disposed in the path of a stream of air, including a stack of substantially horizontal wire mesh screens superposed in spaced apart relation and having wires spaced apart substantially .25 inch for accumulating and holding in suspension at the intersections thereof a multiplicity of globules of water.

7. A liquid evaporating unit adapted to be disposed in the path of a stream of air, including a stack of substantially horizontal wire mesh screens superposed in spaced apart relation and having wires spaced apart at least .20 inch for accumulating and holding in suspension at the intersections thereof a multiplicity of globules of water.

8. In an air conditioning apparatus, a water evaporating unit, means for heating said water, means for supplying water to said unit, selectively operable means for forcing a stream of air through said unit into a space to be conditioned, thermostatic means responsive to said space temperature for initiating operation of said second named means, means for controlling the operation of said water supply means including a device responsive to humidity in the space and thermostatic means responsive to the temperature of said water, said thermostatic means rendering the said humidity responsive device ineffective to control the water supply until a predetermined temperature obtains in the space and the temperature of said water is above a predetermined value.

CLARENCE C. BAILEY.